(12) United States Patent
Millius

(10) Patent No.: US 12,504,774 B2
(45) Date of Patent: Dec. 23, 2025

(54) ACTIVATION SIGNAL FOR SOLENOIDS AND METHOD OF ACTIVATION

(71) Applicant: Rain Bird Corporation, Azusa, CA (US)

(72) Inventor: Michael Joseph Millius, Vail, AZ (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 18/199,522

(22) Filed: May 19, 2023

(65) Prior Publication Data

US 2024/0385631 A1 Nov. 21, 2024

(51) Int. Cl.
*G05D 7/06* (2006.01)
*A01G 25/16* (2006.01)
*B05B 12/02* (2006.01)

(52) U.S. Cl.
CPC ......... *G05D 7/0652* (2013.01); *A01G 25/165* (2013.01); *B05B 12/02* (2013.01)

(58) Field of Classification Search
CPC .... G05D 7/0652; A01G 25/165; B05B 12/02; B05B 1/3006; B05B 1/3053; F16K 31/02; H01F 7/18
See application file for complete search history.

(56) References Cited

U.S. PATENT DOCUMENTS

| | | | |
|---|---|---|---|
| 3,743,898 A * | 7/1973 | Sturman | F02D 41/20 361/194 |
| 4,503,887 A | 3/1985 | Johnson | |
| 5,213,303 A | 5/1993 | Walker | |
| 5,483,411 A | 1/1996 | Sturman | |
| 5,894,398 A | 4/1999 | Harris | |
| 5,924,435 A | 7/1999 | Wall | |
| 6,123,092 A | 9/2000 | Torii | |
| 6,526,945 B2 | 3/2003 | Herzog | |
| 6,619,612 B2 | 9/2003 | Freisinger | |
| 6,662,821 B2 | 12/2003 | Jacobsen | |
| 6,695,281 B2 | 2/2004 | Williams, Jr. | |
| 6,729,601 B2 | 5/2004 | Freisinger | |
| 6,862,165 B2 | 3/2005 | Chian | |
| 7,201,187 B2 | 4/2007 | Irwin | |
| 7,383,721 B2 | 6/2008 | Parsons | |
| 7,475,863 B2 | 1/2009 | Donovan | |
| 7,503,348 B2 | 3/2009 | Irwin | |
| 7,681,807 B2 | 3/2010 | Gregory | |

(Continued)

FOREIGN PATENT DOCUMENTS

EP 1863042 A2 12/2007

*Primary Examiner* — Ziaul Karim
(74) *Attorney, Agent, or Firm* — Fitch, Even, Tabin & Flannery, LLP

(57) ABSTRACT

There is provided an irrigation system and method involving the activation of solenoids. The system may include valves that open to start irrigation and close to stop irrigation and solenoids. Each solenoid may be coupled to a corresponding valve with each solenoid being activated to open its corresponding valve. The system may further include a controller coupled to each solenoid with the controller configured to generate an activation signal to activate each solenoid. In addition, one or more hybrid circuits convert the activation signal to a DC signal for a certain time interval at initiation of the activation signal and then convert it to an AC signal after the predetermined time interval.

10 Claims, 10 Drawing Sheets

(56) References Cited

U.S. PATENT DOCUMENTS

| | | |
|---|---|---|
| 7,847,433 B2 | 12/2010 | Mancebo del Castillo Pagola |
| 7,926,746 B2 | 4/2011 | Melton |
| 8,059,382 B2 | 11/2011 | Schmidt |
| 8,183,719 B2 | 5/2012 | Scripca |
| 8,251,085 B2 | 8/2012 | Goodson |
| 8,295,985 B2 | 10/2012 | Crist |
| 8,659,183 B2 | 2/2014 | Crist |
| 8,740,177 B2 | 6/2014 | Walker |
| 8,868,246 B2 | 10/2014 | Thornton |
| 8,901,771 B2 | 12/2014 | Mancebo Del Castillo Pagola |
| 8,905,058 B2 | 12/2014 | Goodson |
| 9,025,300 B2 | 5/2015 | Okuda |
| 9,097,389 B2 | 8/2015 | Goodson |
| 9,153,970 B2 | 10/2015 | Scripca |
| 9,494,480 B2 * | 11/2016 | Klicpera ................ G01M 3/00 |
| 9,539,674 B2 | 1/2017 | Walker |
| 9,618,137 B2 | 4/2017 | Ferrer Herrera |
| 9,693,510 B2 | 7/2017 | Ferrer Herrera |
| 9,763,393 B2 | 9/2017 | Parsons |
| 9,870,887 B2 | 1/2018 | Woytowitz |
| 9,964,231 B2 | 5/2018 | Ferrer Herrera |
| 10,302,220 B2 | 5/2019 | Ferrer Herrera |
| 10,609,877 B2 | 4/2020 | Ferrer Herrera |
| 10,677,375 B2 | 6/2020 | Ferrer Herrera |
| 10,709,298 B2 | 7/2020 | Yu |
| 10,731,764 B2 | 8/2020 | Niess |
| 10,871,242 B2 | 12/2020 | Markley |
| 10,980,120 B2 | 4/2021 | Kwak |
| 11,095,960 B2 * | 8/2021 | Klicpera ............ H04L 12/2827 |
| 11,391,392 B2 | 7/2022 | Niess |
| 11,578,812 B2 | 2/2023 | Busch |
| 11,721,465 B2 | 8/2023 | Tresso |
| 11,796,071 B2 | 10/2023 | Niess |
| 2001/0032947 A1 | 10/2001 | Freisinger |
| 2005/0167625 A1 | 8/2005 | Deen |
| 2005/0199842 A1 | 9/2005 | Parsons |
| 2005/0211608 A1 | 9/2005 | Lockwood |
| 2006/0016494 A1 | 1/2006 | Irwin |
| 2006/0043208 A1 * | 3/2006 | Graham ................ A01G 25/16 239/69 |
| 2006/0131220 A1 | 6/2006 | Lockwood |
| 2006/0272704 A1 * | 12/2006 | Fima ..................... E03B 7/071 137/12 |
| 2006/0272830 A1 * | 12/2006 | Fima ..................... F24H 15/212 169/16 |
| 2008/0029722 A1 | 2/2008 | Irwin |
| 2008/0035220 A1 | 2/2008 | Irwin |
| 2008/0157995 A1 | 7/2008 | Crist |
| 2008/0289693 A1 | 11/2008 | Irwin |
| 2009/0001193 A1 | 1/2009 | Parsons |
| 2011/0309274 A1 | 12/2011 | Parsons |
| 2013/0173070 A1 * | 7/2013 | Tennyson ............... G05B 19/02 700/284 |
| 2013/0320250 A1 | 12/2013 | Graham |
| 2014/0014861 A1 | 1/2014 | Saruwatari |
| 2014/0129039 A1 | 5/2014 | Olive-Chahinian |
| 2014/0252114 A1 * | 9/2014 | Hamann ............... A01G 25/162 239/11 |
| 2014/0277782 A1 | 9/2014 | Martinez |
| 2015/0144815 A1 | 5/2015 | Walker |
| 2016/0163177 A1 * | 6/2016 | Klicpera ................ E03B 7/071 137/59 |
| 2016/0209045 A1 * | 7/2016 | Millius ................ H05B 1/0258 |
| 2018/0231143 A1 * | 8/2018 | Ferrer Herrera ...... H01F 7/1844 |
| 2019/0234786 A1 * | 8/2019 | Klicpera ................. G01M 3/26 |
| 2019/0281371 A1 * | 9/2019 | Klicpera ................. H04Q 9/00 |
| 2021/0243972 A1 | 8/2021 | Nickerson |
| 2021/0335530 A1 | 10/2021 | Tresso |
| 2022/0154847 A1 | 5/2022 | Nøhr |
| 2022/0304263 A1 | 9/2022 | Nickerson |
| 2022/0368195 A1 | 11/2022 | Millius |
| 2024/0247967 A1 * | 7/2024 | Klicpera ................ G01F 25/10 |
| 2024/0385631 A1 * | 11/2024 | Millius ................ B05B 12/02 |

* cited by examiner

ACTIVATION SIGNAL FOR SOLENOIDS AND METHOD OF ACTIVATION

FIELD

The present application relates to solenoids, and more particularly, to an activation signal for a solenoid.

BACKGROUND

In various fields, solenoids may be used to control different types of electrical components or assemblies. For example, in the field of irrigation, solenoids may be used to activate valves and valve assemblies, which may be used to control the delivery of water from a water source to desired areas. Further, in the field of irrigation, solenoids may be used to control valve assemblies to irrigate different zones of an overall landscape in accordance with scheduled irrigation times. Solenoids and other electrical devices often receive an activation signal from a controller, which, in turn, may control the opening and closing of valves and valve assemblies.

Given the prevalent use of solenoids, it is desirable to provide an activation signal with characteristics that provide advantages in the use of solenoids. It is desirable to have an activation signal and circuitry that could result in a lower cost solenoid design and/or longer life for the solenoid. In addition, there is a need for a system capable of activating a solenoid with longer wire run distances from a controller governing the operation of an irrigation system to solenoids in the irrigation system. It also is desirable to make longer wire run distances using a finer gauge lead wire to reduce cost.

There is also a need for greater flexibility in the use of controllers. With an improved activation signal, controllers may be more successful at activating various types of solenoids and/or at different distances from the controller. Further, it would be desirable to utilize an improved activation signal that may facilitate the replacement of controllers that have already been installed.

DETAILED DESCRIPTION

Figure 1:
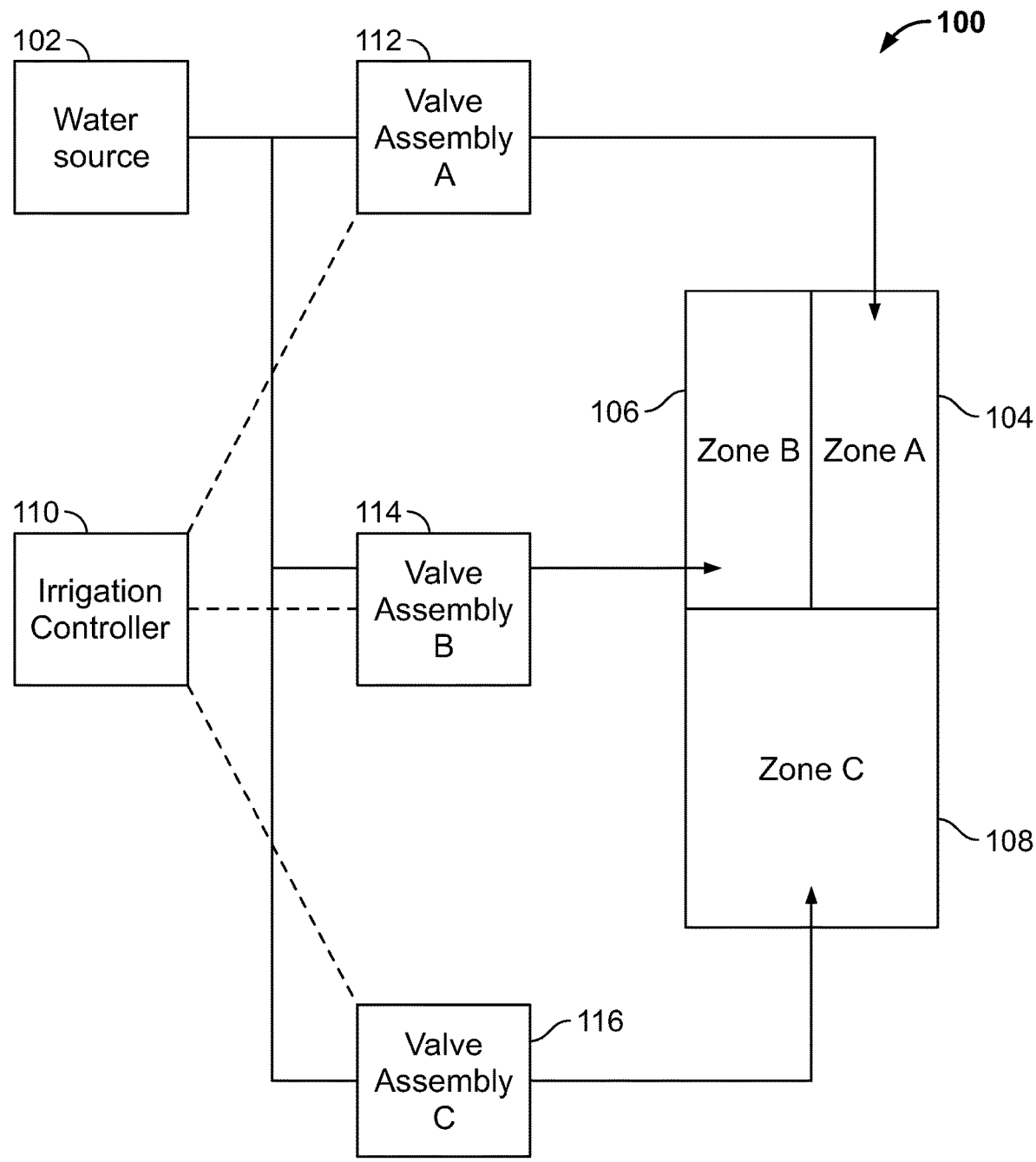
FIG. 1 is a schematic diagram of an irrigation system using valve assemblies to control irrigation of various zones.

In the irrigation field, it is often desirable to use different valve assemblies to control irrigation to different zones of a geographic area or landscape. FIG. 1 illustrates an exemplary irrigation system 100 that includes a water source 102 supplying water to three irrigation zones: Zone A 104, Zone B 106, and Zone C 108. An irrigation controller 110 controls three valve assemblies 112, 114, and 116, one for each of the three zones 104, 106, and 108, respectively. With this system, the irrigation controller 110 may control the three valve assemblies pursuant to a watering schedule set by the user, such as a homeowner. The irrigation controller 110 operates to provide each zone with a desired amount of irrigation at a desired time.

Figure 2:
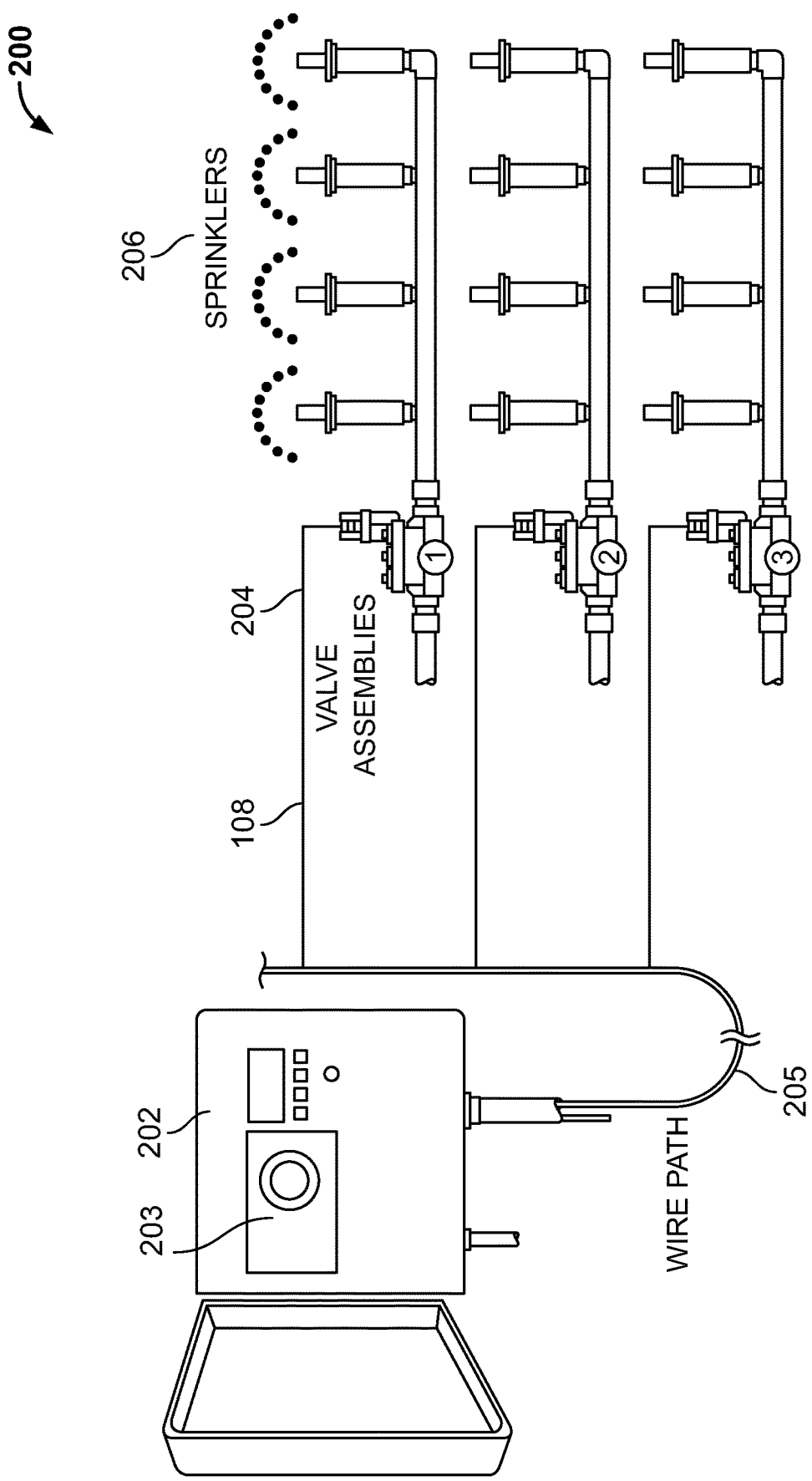
FIG. 2 is a schematic diagram of an irrigation system using valve assemblies to control irrigation of various zones.

In FIG. 2, another schematic diagram of an exemplary irrigation controller-based irrigation system 200 is shown. In this embodiment, a dedicated irrigation controller 202 includes all functionality to generate and execute irrigation schedules with user input. That is, in one form, the controller 202 includes a user interface 203 (e.g., rotary dial, buttons, display screen, and so on) and includes programming (e.g., firmware stored in memory of the controller 202). FIG. 2 illustrates valve assemblies 204 that may be coupled to the controller 202 by wire paths/runs 205. The valve assemblies 204 control water flow through a pressurized water pipe to sprinkler devices 206. In some embodiments, each valve assembly 204 corresponds to, or is assigned to, a particular irrigation zone. Further, each valve assembly 204 may control water flow to one or more sprinkler devices 206 in its corresponding irrigation zone.

The controller 202 preferably includes various user-friendly control features, such as, for example, an electronic display screen, a rotary dial (or mode knob), and/or push buttons. The display screen may show relevant scheduling information, such as, for example, time of day, day of the week, etc. The rotary dial and/or push buttons may allow a user to select various operational modes and settings, including, for example, setting a clock, start and end times of irrigation for different zones, and the duration of irrigation for different zones.

Various features, settings, and functionality have been described above. It should be understood, however, that these are simply examples and are not intended as limitations on the controller. Some or all of the above features and settings are not required in the irrigation device. In certain forms, it is contemplated that a limited number of features and settings may be incorporated into the irrigation device, as desired. Further, in other forms, additional or different features and settings may be utilized in the irrigation device.

Solenoids are commonly used for various purposes in the field of irrigation. In one form, they are used in combination with valves to control fluid flow through the irrigation system. A typical solenoid valve includes an inlet, an outlet, and a valve seat between them. In one exemplary form, a diaphragm engages the valve seat to prevent flow through the valve and is moved off the valve seat to permit flow through the valve. In this form, a pressure chamber is located on the side of the diaphragm opposite the valve seat. Fluid from the inlet side of the valve seat flows into the pressure chamber, such as through a port in the diaphragm. The fluid builds up in the pressure chamber causing the diaphragm to close against the valve seat. In this form, to open the valve, the solenoid is energized to open a vent passage from the pressure chamber to the outlet side of the valve seat to release fluid pressure in the pressure chamber so that the inlet pressure of the fluid can raise the diaphragm off the valve seat. Further, in this form, to close the valve, the solenoid is deenergized so that the pressure chamber can become pressurized to overcome the inlet pressure, forcing the diaphragm onto the valve seat.

Figure 3A:
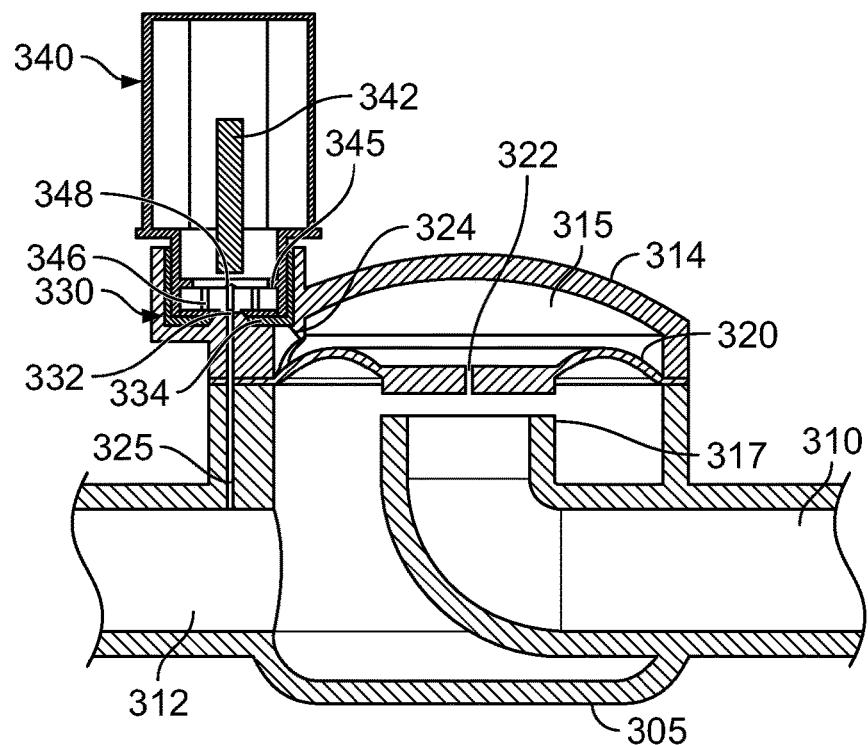
FIG. 3A is a cross-section view of a solenoid valve in an open position.
Figure 3B:
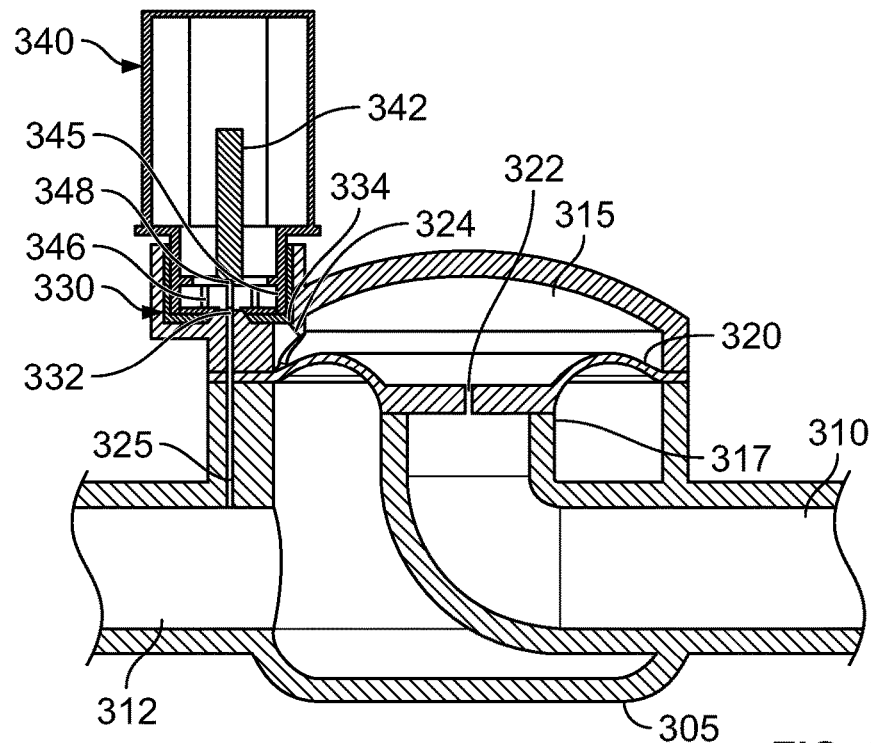
FIG. 3B is a cross-section view of the solenoid valve of FIG. 3A in a closed position.
Figure 4:
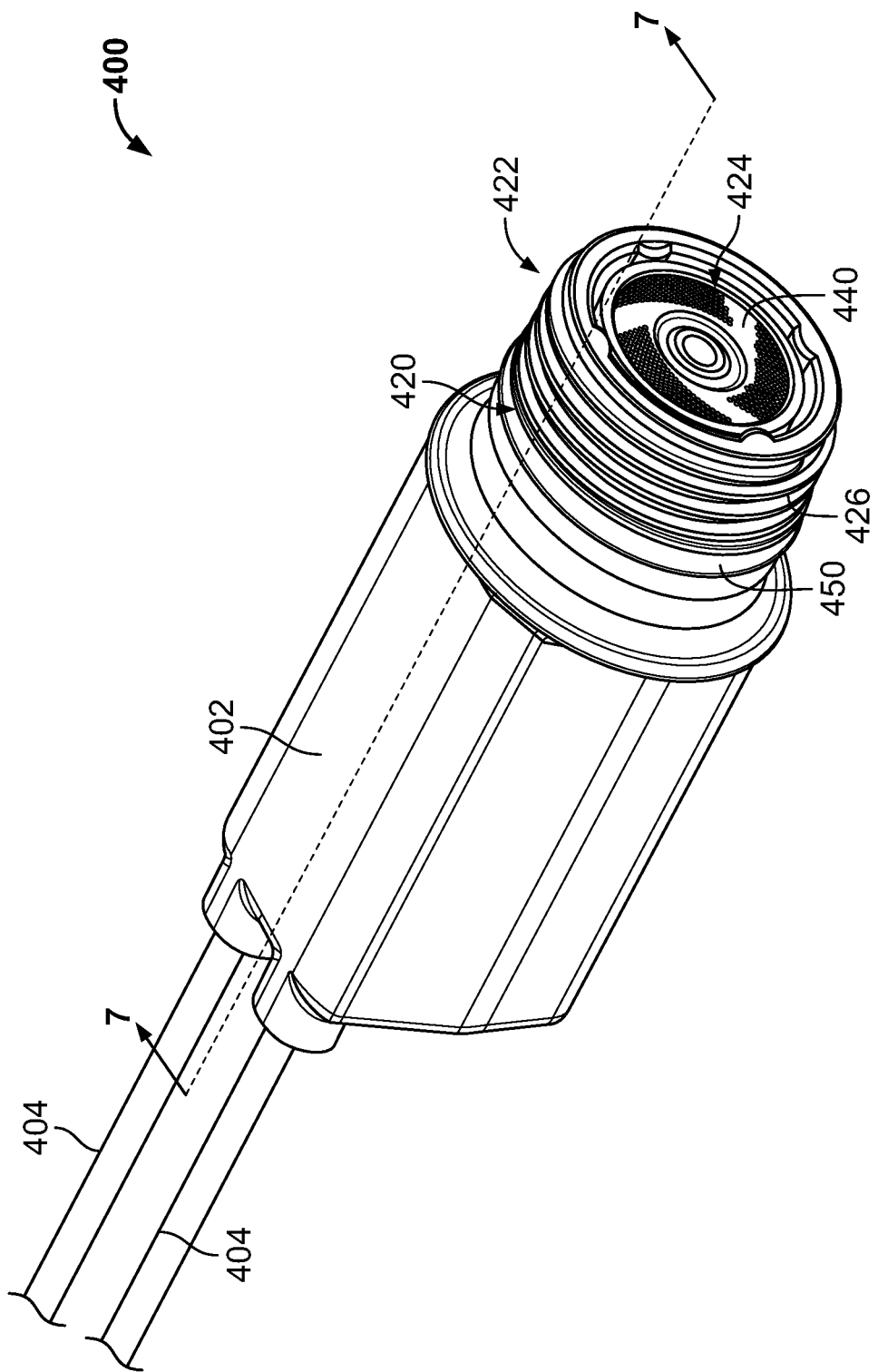
FIG. 4 is a perspective view of a solenoid.
Figure 5:
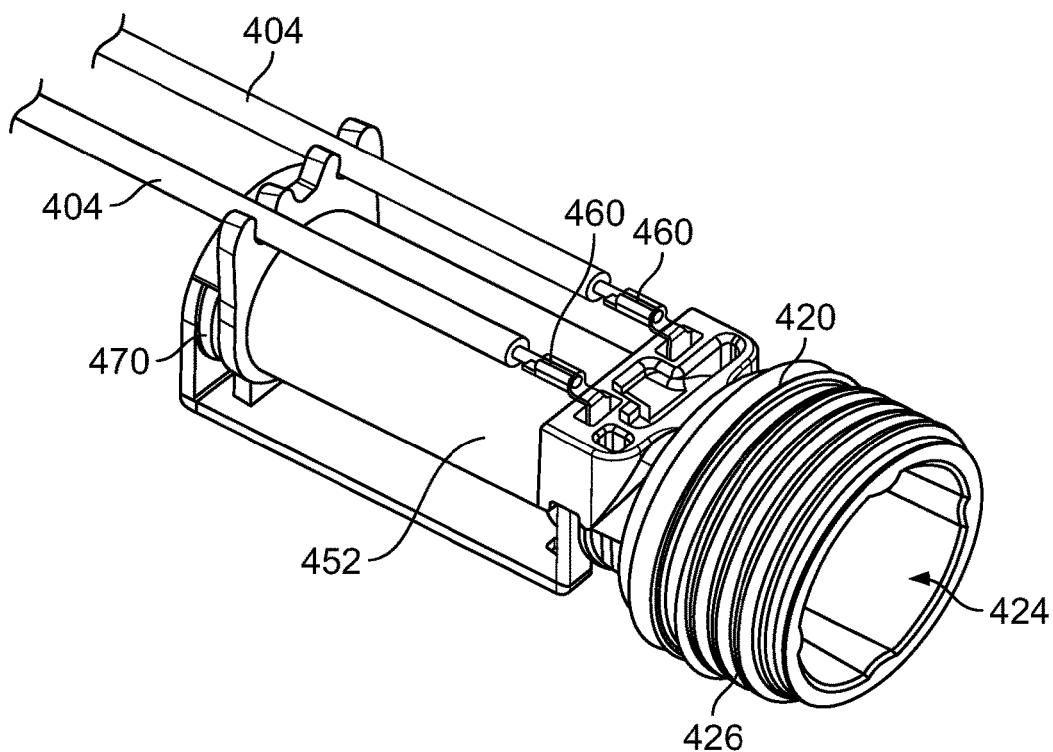
FIG. 5 is a perspective view of the solenoid of FIG. 4 partially assembled.
Figure 6:
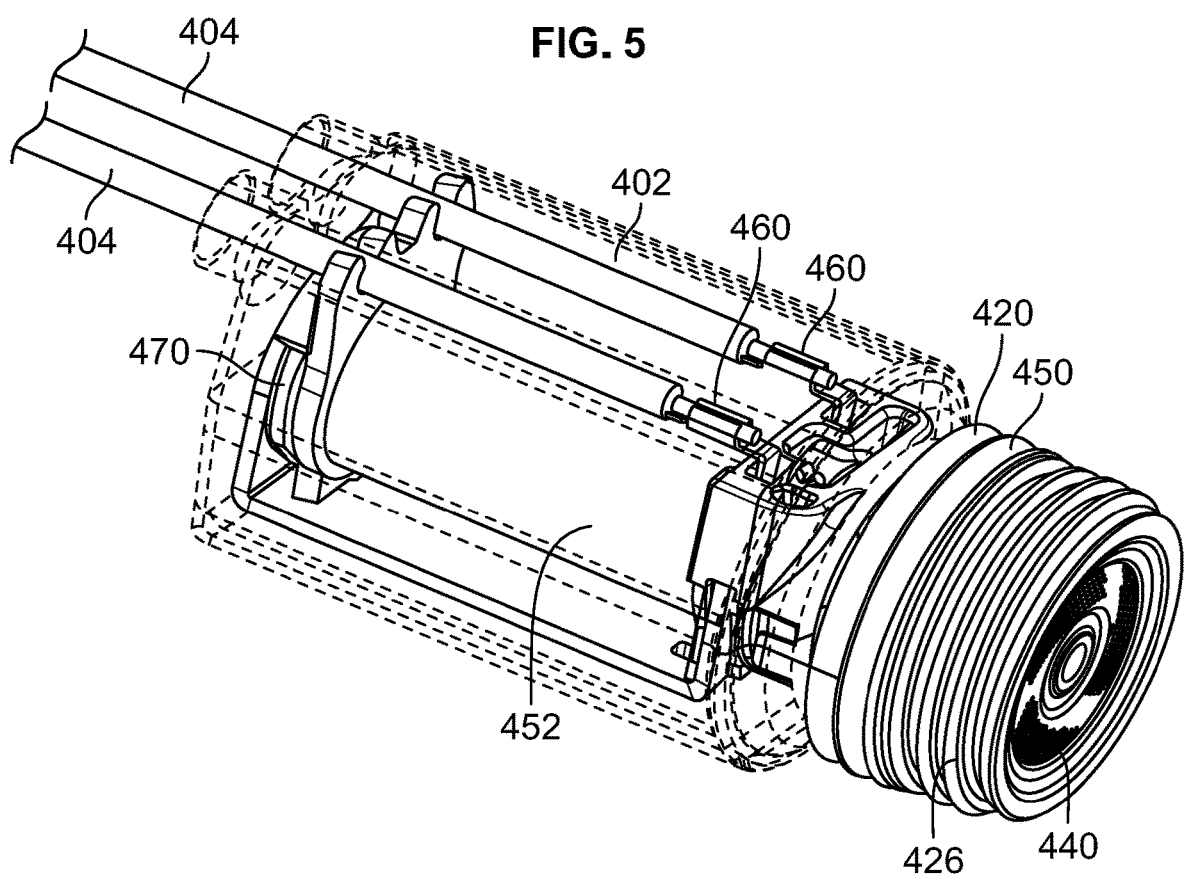
FIG. 6 is a top perspective view of the solenoid of FIG. 4 shown with a transparent housing.
Figure 7:
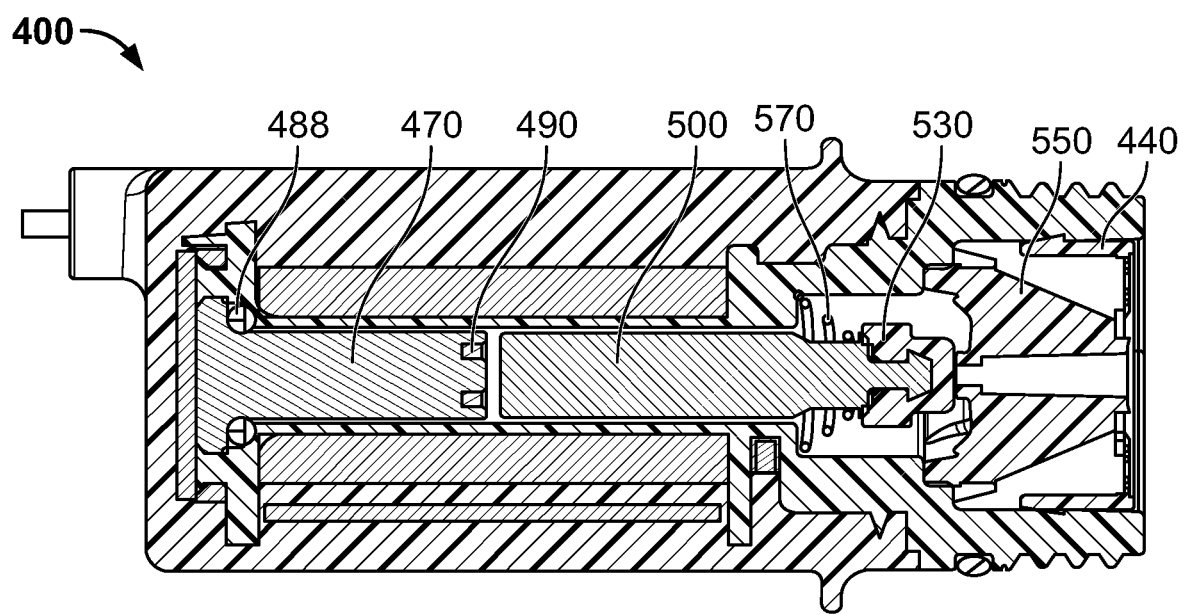
FIG. 7 is a cross-section view of the solenoid of FIG. 4.

FIGS. 3A and 3B show an example of one type of solenoid valve 300. As stated, solenoid valves (like solenoid valve 300) are commonly used to control fluid flow through an irrigation system. For instance, activation (or energizing) of the solenoid may open the valve, while deactivation (or deenergizing) may close the valve. In this example, a solenoid valve 300 may be used to control fluid flow to a particular irrigation zone, so that a first solenoid valve 300 controls fluid flow to Zone A 104, a second solenoid valve 300 controls fluid flow to Zone B 106, and a third solenoid valve 300 controls fluid flow to Zone C 108.

FIG. 3A illustrates the valve 300 in an open position, and FIG. 3B illustrates the valve 300 in a closed position. The solenoid valve 300 includes a valve body 305 and a bonnet 314. The valve body 305 includes an inlet 310, an outlet 312, a primary valve seat 317 between the inlet 310 and outlet 312 and a diaphragm 320 that engages the primary valve seat 317 to prevent flow (as illustrated in FIG. 3B) and that lifts off the primary valve seat 317 to allow flow (as illustrated in FIG. 3A). The bonnet 314 and the diaphragm 320 form a pressure chamber or control chamber 315, and the diaphragm 320 includes a passage 322 for fluid to pass from the inlet side of the diaphragm 320 to fill the pressure chamber 315. In some forms, the valve 300 may also include a spring (not shown) in the bonnet 314 that biases the diaphragm 320 to the closed position. When the pressure chamber 315 fills with fluid and the fluid is prevented from exiting the chamber downstream, i.e., from venting, the pressure in the chamber forces the diaphragm onto the valve seat 317 to close the valve. When the pressure chamber 315 is permitted to vent, the pressure in the chamber is reduced, allowing the pressure pushing up from the inlet 310 to lift the diaphragm 320 off the valve seat 317 to open the valve.

In this form, the bonnet 314 includes a solenoid bowl 330 to attach a solenoid 340 to the solenoid valve 300. The solenoid bowl 330 includes internal threading that mates with external threading on the solenoid 340 to mount the solenoid 340. The solenoid 340 controls the opening and closing of the valve 300 by either permitting or preventing venting of the pressure chamber 315. To this end, a vent passage flow path exists between the pressure chamber 315 and the outlet 312 of the valve 300. Fluid from the pressure chamber is vented by flowing through a pressure chamber vent passage 324 into the solenoid bowl 330, and then out the solenoid bowl 330 to the outlet 312 side of the valve 300 via a downstream vent passage 325. The solenoid 340 permits or prevents the venting of the fluid from the solenoid bowl 330 when a plunger 342 of the solenoid 340 opens and closes a secondary valve seat (in this case a central bleed port 348 of a solenoid retainer 345) along the vent passage flow path.

In the closed position, the plunger 342 is in engagement with the secondary valve seat (i.e., the retainer bleed port 348) and pressure increases in the pressure chamber 315 to force the diaphragm 320 into engagement with the primary valve seat 317 to close the valve 300. In the open position, the plunger 342 is spaced from the secondary valve seat (i.e., retainer bleed port 348) and fluid flows from the pressure chamber 315 to the outlet 312, thereby relieving pressure in the pressure chamber 315 and allowing the pressure of the inlet fluid to move the diaphragm 320 off the primary valve seat 317 to permit flow through the valve 300. In other words, movement of the plunger 342 controls opening and closing of a pilot valve (i.e., the retainer bleed port 348), which in turn controls opening of the main valve 300.

With reference to FIGS. 3A and 3B, the exit opening 332 of the solenoid bowl 330 is positioned at the center of the solenoid bowl 330, aligned with the axially central plunger 342 of the solenoid 340, and the entrance opening 334 is positioned radially outwards from center. In such a configuration, the exit opening 332 (or, in this case, a central bleed port 348 of a solenoid retainer 345 aligned with the exit opening 332) constitutes the secondary valve seat of the vent passage flow path. Further, the radially positioned entrance opening 334 is never blocked, and the pressure chamber 315 is in constant fluid communication with the solenoid bowl 330, the high-pressure fluid flooding the solenoid bowl 330 through the entrance opening 334 from the pressure chamber vent passage 324. In this configuration, when the solenoid 340 is deenergized, the axially central plunger 342 of the solenoid 340 blocks the centrally positioned exit opening 332 of the solenoid bowl 330, preventing the fluid from exiting the solenoid bowl 330, and thereby inhibiting venting of the pressure chamber 315. When the solenoid 340 is energized, the plunger 342 is lifted off the centrally positioned exit opening 332, permitting the pressure chamber 315 fluid to flow out the exit opening 332 of the solenoid bowl 330 into the downstream vent passage 325, thus venting the pressure chamber 315.

It is noted that, with certain solenoids, the plunger may not directly engage the central opening of the solenoid bowl to block the central opening. For instance, in the solenoid valve 300 shown in FIGS. 3A and 3B, the solenoid 340 may include a plunger retainer 345 downstream of the plunger. A bottom of the plunger retainer 345 may include one or more radially disposed ports 346 to permit passage of fluid entering the solenoid bowl 330 to a location above the retainer 345 in the solenoid 340. The plunger retainer 345 also includes a central bleed port 348 that is aligned with the central opening 332 of the solenoid bowl permitting fluid communication therebetween. Thus, in such a configuration, the plunger 342 becomes seated or unseated on the central bleed port 348 of the retainer 345 to prevent or permit fluid from flowing through the central opening 332 of the solenoid bowl 330.

It should be understood that the solenoid valve 300 described above is just one example of a valve assembly that may be used in irrigation systems. Other valves and valve structures may be used in combination with the activation of solenoids described herein. Further, in certain forms, it is contemplated that solenoids may be used in conjunction with other electrical devices that are not used in irrigation. Other solenoid, solenoid valve, and irrigation arrangements are shown in U.S. Publication No. 2021/0335530; U.S. Publication No. 2022/0368195; U.S. Publication No. 2022/0304263; U.S. application Ser. No. 18/151,314; and U.S. Pat. Nos. 5,213,303; 7,201,187; 7,503,348; and 8,740,177; all of which are incorporated herein by reference in their entirety.

Referring to FIGS. 4-7, an exemplary form of solenoid 400 is shown. In this form, the solenoid 400 includes a housing 402 containing the internal components of the solenoid 400. Two wires 404 extend from the housing 402. The wires 404 may be connected to a controller to provide power to the solenoid 400. The attachment portion 422 of a bobbin 420 extends from the housing 402. The attachment portion 422 defines a valve cavity 424 where a filter 440 is inserted. The attachment portion 422 includes threads 426 disposed on a surface thereof for attachment to a solenoid bowl of a main valve (not shown). A gasket 450 is positioned on the attachment portion 422 of the bobbin 420. The gasket 450 may prevent fluid from flowing or leaking out of the solenoid bowl of the main valve when the solenoid 400 is attached to the main valve.

The bobbin 420 includes a tube portion about which a coil of wire 452 is wound. The ends of the coil of wire 452 may be connected to terminals 460. Wires 404 may also be connected to the terminals 460. A core 470 includes a portion which is inserted into the tube portion of the bobbin 420 at the end opposite the valve cavity 424 of the bobbin 420. A gasket 488 may be positioned between the portion of the core 470 remaining outside of the bobbin 420 and the bobbin 420. A shading ring 490 is positioned on an end of the core 470 inserted into the bobbin 420. A plunger 500 may be inserted into the interior of a tube portion of the bobbin 420. An end of the plunger 500 may be adjacent the core 470 and/or shading ring 490 within the tube portion when retracted to an open position. A sealing cap 530 may be positioned over an end of the plunger 500 extending into the valve cavity 424. A retainer 550 defining a fluid flow path may be inserted into the valve cavity 424 to retain the plunger 500 within the bobbin 420. A spring 570 may extend from an internal surface of the bobbin 420 within the valve cavity 424 to the plunger 500 to bias the plunger 500 against the retainer 550. The filter 440 may be inserted in the valve cavity 424 after the retainer 550 has been inserted.

In operation, when activated, electrical power is supplied to the terminals 460 via the wires 404 extending from a power source. Current flows through the coil of wire 452 wrapped about the bobbin 420. The flow of current through the coil 452 induces a magnetic field that forms a loop extending through the inner diameter of the coil and returning around the exterior of the coil 452 thereby forming a magnetic circuit. The magnetic field acts on a plunger to move the plunger to either open or close the pilot valve, which, in turn, opens or closes the main valve.

It should be understood that the solenoid 400 described above is just one example of a solenoid that may be used herein. In other words, other types of solenoids may be used in combination with the activation of solenoids described herein. It is generally contemplated that the activation signal may be used in conjunction with various types of controllers coupled (such as by wires) to various types of solenoids. Exemplary types of solenoids that may be used herein are shown, for example, in U.S. Publication No. 2021/0335530, which is incorporated herein by reference in its entirety.

Next, the activation signal is described, i.e., when electrical power is supplied. During irrigation, an activation signal is transmitted from the controller via wires to a corresponding solenoid valve. This activation signal triggers the solenoid to open the valve. Generally, the controller generates and transmits an alternating current (AC) activation signal that is used to trigger the solenoid, such as, for example a 24 Volt (V) AC solenoid. However, as addressed further below, it has been found to be beneficial to convert the AC to direct current (DC), either at the controller or at the solenoid, such that a DC pulse is used at the beginning of the activation for the solenoid.

In AC solenoids, the gap between the plunger and the core at the time of valve activation provides increased current due to reduced inductance in the magnetic circuit of the solenoid. After the valve opens, the plunger to core air gap is reduced causing inductance to rise and electrical current to lower. In one form, while the peak voltage of a 24V AC 60 Hz waveform is about 34 V, the duration of each peak as part of the AC sinusoidal wave is what limits the available current to the solenoid. In one form, a common solenoid uses about 171 mA and 2.1 watts with a 24V AC supply, but this same solenoid uses roughly 500 mA (24 V/48 ohms) and 12 watts with a 24 Volt DC supply. Although this amount of power would cause serious life duration issues for a solenoid, the increased current would be very beneficial during the initial phase of solenoid activation.

Figure 8:
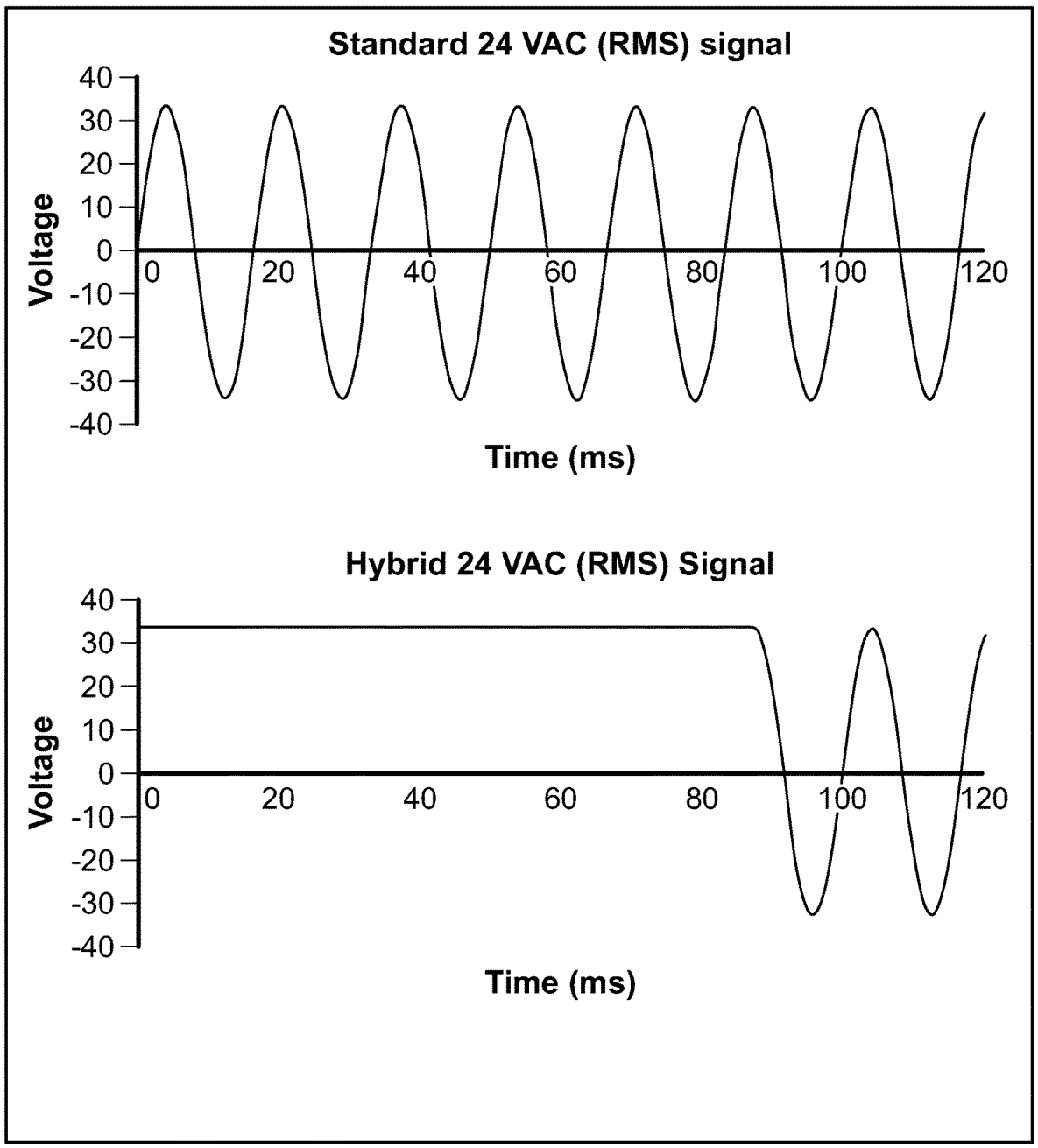
FIG. 8 shows a standard AC waveform in comparison to a hybrid waveform with an initial DC wave component.

A circuit at a solenoid or to a controller is designed to generate a waveform with a higher DC component first and then an AC component. FIG. 8 shows an example of a standard AC waveform in comparison to a hybrid waveform with an initial DC component. In this latter example, at about 90 milliseconds (ms), the waveform switches from DC to AC. An advantage of having this constant, higher voltage for a longer duration at activation is to overcome the larger pressure forces seen by the plunger seal. Once this plunger force is overcome, a much lower solenoid force can maintain solenoid activation. With this arrangement, the most expensive components (such as magnet wire, plunger, core, and frame) in a solenoid could be optimized to leverage this increased initial voltage/current.

Figure 9:
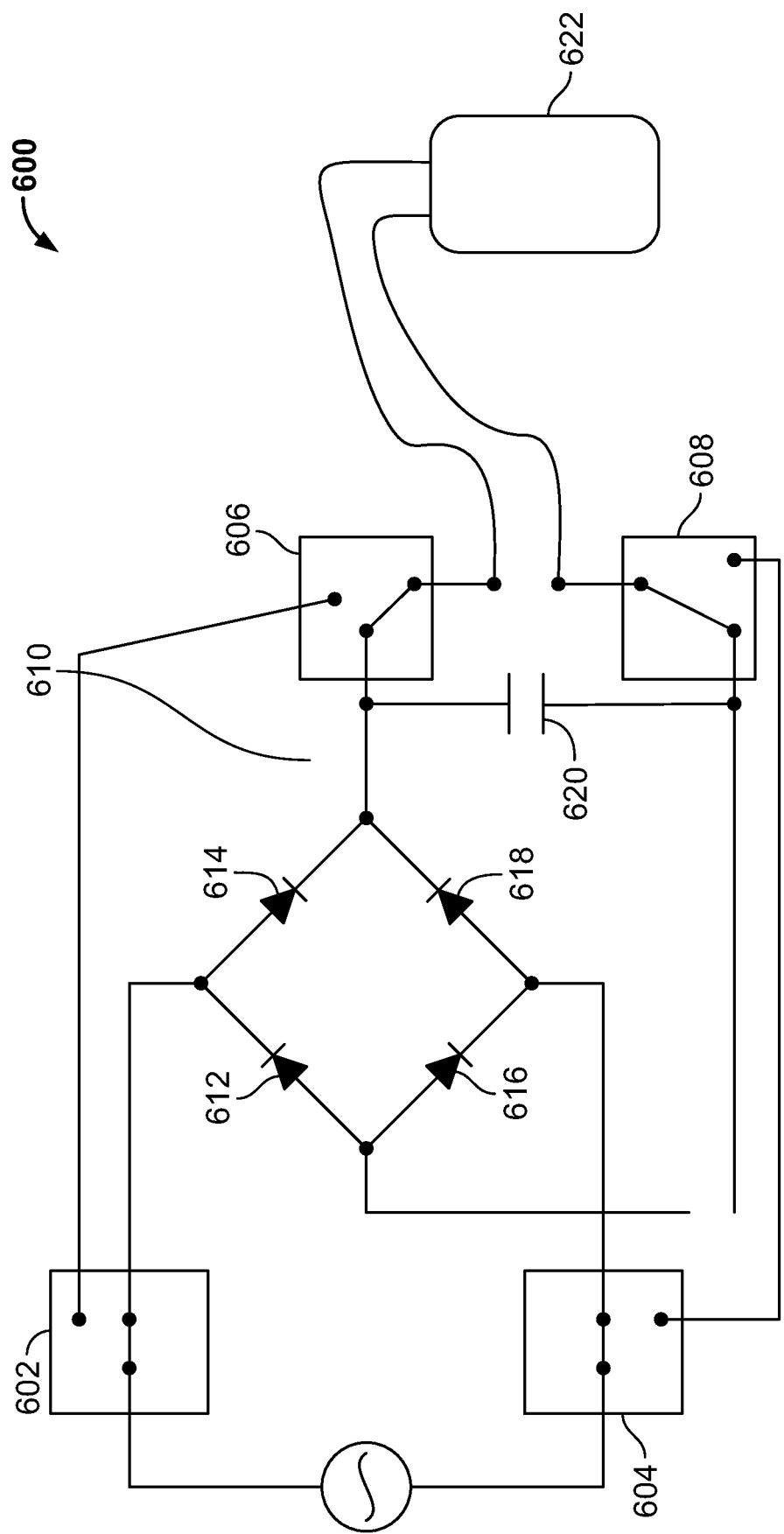
FIG. 9 is a circuit diagram illustrating an embodiment of a hybrid circuit in a closed orientation.

FIG. 9 shows an example of a circuit 600 that for generating an initial DC component to activate a solenoid. This DC component is intended to be temporary and then switched to an AC waveform. This exemplary circuit initially uses full wave bridge rectification with a capacitor for filtering to achieve the DC component. After a short period of time, such as on the order of 150 ms, the solenoid will have reached peak current and therefore peak force, which will cause the plunger to move. So, in this example, it may be desirable to use about 150 ms as a time interval for the DC component. Although 90 ms and 150 ms are indicated as possible time intervals in the examples of FIGS. 8 and 9, it should be understood that various time intervals may be used depending on various factors, like the nature and type of solenoid involved, including the forces needed to move the plunger initially and then maintain it away from the secondary seat.

It is generally contemplated that, in one form, the time interval may be selected so as to balance the need to activate the solenoid with the desire to avoid unduly reducing the life of the solenoid. It is believed that, related to the length of the DC signal, benefits would start occurring at about 10-12 ms, where the signal has likely gone through about three-quarters of a full wave form. As far as a maximum duration of the DC component, it is believed that this would depend greatly on the inductance/impedance of the solenoid itself. A large inductance would cause the rise time of the solenoid to be longer. In practice, it is believed that about 500 ms would be long enough for most solenoids to activate. Further, for some types of solenoids, it may be desirable to avoid a time interval of more than one second to avoid reducing the useful life of the solenoid where it is contemplated that there will be repeated activation of the solenoid.

In FIG. 9, there are four relays or electrical switches 602, 604, 606, and 608. In this example, the circuit 600 uses a full wave bridge rectifier 610 with diodes 612, 614, 616, and 618 and capacitor 620. In FIG. 9, the electrical switches 602, 604, 606, and 608 are initially in closed positions to activate the full wave bridge rectifier (or full wave bridge rectification circuit) to generate initial DC power to the solenoid 622.

Figure 10:
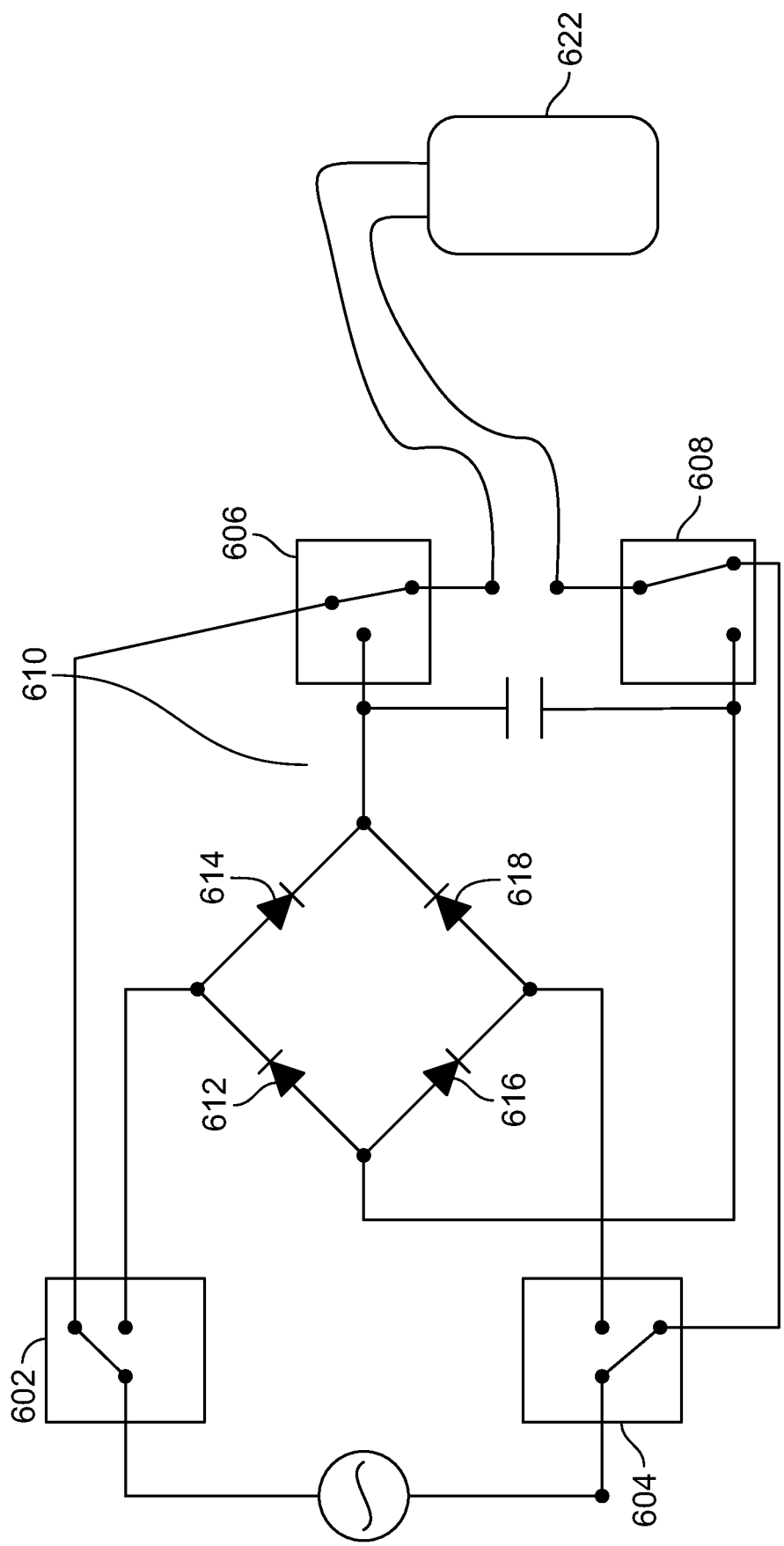
FIG. 10 is the circuit diagram of FIG. 9 in an open orientation.

In FIG. 10, after the selected duration of time, the electrical switches are shifted to open positions. In these open positions, the full wave bridge rectifier 610 is bypassed. As a result, the DC circuit is replaced with an AC circuit. It is generally contemplated that any of various types of switches may be used, such as, for example, mechanical relays, solid state relays, and other transistor/FET arrangements.

Further, it should be understood that this circuit is just one example of a hybrid arrangement generating initial DC power and then switching over to AC power. It is generally contemplated that any of various approaches for generating initial DC power may be used, not just a full wave bridge rectifier. It is also generally contemplated that any of various approaches for applying a timer for switching over to AC power may be used. For example, processors may be used as timers for controlling the transition from DC to AC. In this context, the term processors refers broadly to any microcontroller, computer, or processor-based device with processor, memory, and programmable input/output peripherals, which is generally designed to govern the operation of other components and devices. These architectural options are well known and understood in the art and require no further description here.

In addition, it should be understood that "DC signal" refers broadly to a signal generally exhibiting positive values (or generally exhibiting negative values). This DC signal is in contrast to an AC signal that alternates, i.e., that consistently exhibits both positive and negative values. For example, in FIG. 8, the hybrid signal includes an initial DC component from about 0 ms to 90 ms. Although this DC signal or DC component is shown in an idealized form with a constant value of about 34 V, this disclosure does not require that the DC signal/component maintain a constant value. It is generally contemplated that any form of DC signal may be used, i.e., a signal with values generally on one side of the x-axis in FIG. 8.

For instance, as addressed above, an AC signal may be converted to a DC signal by rectification. By using bridge rectification, an AC waveform can be converted so that one of the halves of the sine wave is flipped leaving a waveform on one side (positive or negative). This bridge rectification therefore results in a first type of a DC signal that may be suitable for use herein. However, this DC signal may be even further refined. For example, by adding a smoothing capacitor (such as capacitor 620 in FIG. 9), the DC waveform becomes more flattened, based on the size of the capacitor and the amount of loading to the circuit. This results in a second type of a DC signal. In this second type, the rectified DC signal may more closely approximate a constant value, which may be desirable in certain circumstances but which is not required by this disclosure for all circumstances. Accordingly, it should be understood that any of various forms of rectification may be used that may result in different types of DC signals and in different DC waveforms.

Next, it is generally contemplated that the hybrid circuit may be disposed at several different locations. First, the hybrid circuit may be integrated into the controller of an irrigation system, such as, for example, one that controls the solenoid valves pursuant to an irrigation schedule. One logical location for a hybrid circuit would be inside the controller (FIGS. 9 and 10). Additional circuitry can be populated at the same time as the electrical components of the controller. Control for going from AC to DC waveform can be controlled by the controller. Some form of timer could be included in the controller to measure a time interval so that the AC activation signal is converted to a DC signal during that time interval. Locating a new hybrid circuit in the controller also means that one new additional circuit can control multiple valves. So, in some implementations, this disposition in the controller may be a desirable approach.

Second, a hybrid circuit could also be located inside of a solenoid. This approach may allow the hybrid circuit to be added to the system without upgrading the controller. Such an approach may require a larger solenoid housing than generally used for solenoids without such circuits. Each solenoid would include a hybrid circuit, so there would be multiple hybrid circuits. In certain circumstances, such as where modification of a controller is not feasible, this approach may be a desirable approach.

Figure 11:
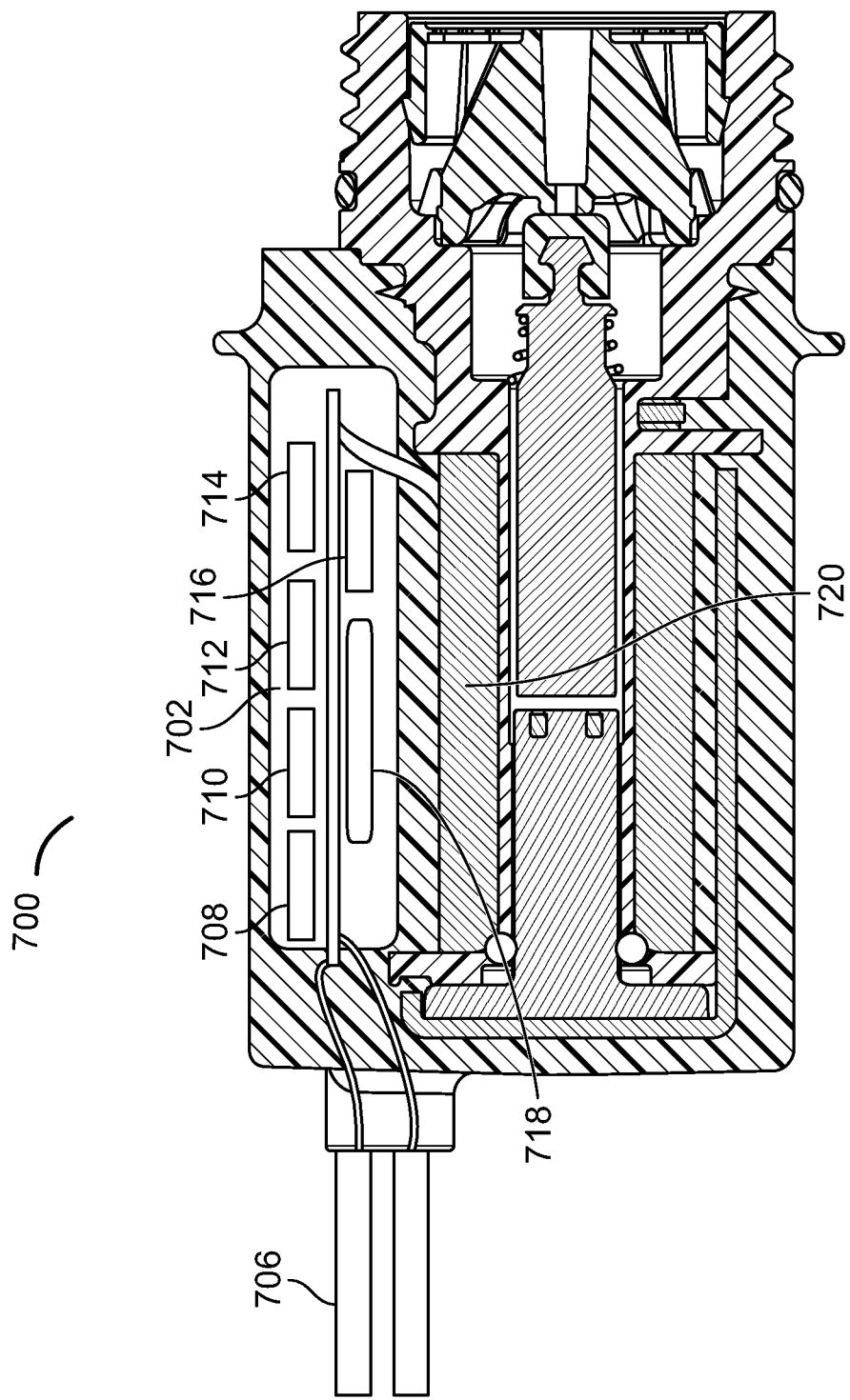
FIG. 11 is a cross-section view of the solenoid of FIG. 4 that has been modified to include the hybrid circuit of FIG. 9.

FIG. 11 shows an example of a solenoid 700 with an integrated hybrid circuit 702. As can be seen, the hybrid circuit 702 may be introduced in the solenoid between incoming wires 706 and other parts of the solenoid. The hybrid circuit 702 may be in the form of a hybrid control printed circuit board (PCB) that includes four diodes 708, 710, 712, and 714 and a capacitor 716. Further, it includes a timer processor/chip 718 that controls the hybrid activation of the solenoid 700 and that controls the transition from DC to AC after a certain time interval. The output from the timer processor/chip 718 is inputted to the solenoid coil 720.

Third, the hybrid circuit could be disposed at some location between the controller and the solenoid. There may be some advantages in some implementations. For example, this hybrid circuit could be retrofitted without modifying the controller or the solenoids in an existing irrigation system. The exact location between the controller and solenoids would not affect operation of the hybrid circuit, so one or more hybrid circuits could be disposed in desired locations, such as for example, in a valve box, in the middle of the wires, or near the controller. The controller is coupled to each solenoid by wire, and the hybrid circuit(s) may be disposed along the wire intermediate the controller and each solenoid.

This disclosure also contemplates a method of irrigation involving activating a solenoid using a hybrid circuit. It is generally contemplated that the method may make use of some or all of the components addressed above, which are incorporated herein. The method generally involves conversion of an AC activation signal to a DC signal for a predetermined amount of time so as to activate one or more solenoids, and, in turn, each solenoid opens a valve in an irrigation system. In one form, when solenoid(s) are to be activated to start an irrigation cycle, the signal is transmitted from a controller in the irrigation system to one or more solenoids and is converted by a hybrid circuit at some point. The hybrid circuit may be disposed in the controller, in the solenoid(s), or at some other intermediate location along a wire run or path between the controller and the solenoid(s). After the predetermined time interval for initial activation of the solenoid(s), the DC signal is switched back to an AC signal. As stated above, any of various time intervals may be used, and the above discussion of possible time intervals is incorporated herein. Generally, it is contemplated that the time interval may be selected so as to balance the need to activate the solenoid with the desire to avoid unduly reducing the life of the solenoid.

It is generally contemplated that providing a short DC pulse at the beginning of solenoid activation results in several advantages. It may provide advantages relating to the cost and design of controllers and/or solenoids used in irrigation systems. For example, it may allow a lower cost solenoid design, such as, for example, a finer gauge wire for the solenoid coil. Further, it may also allow the use of a controller capable of allowing standard solenoids to activate with longer wire run distances and finer gauge lead wire for wire runs. By using a DC pulse at initial activation to overcome the solenoid plunger force, a much lower solenoid force can then maintain solenoid activation, thereby allowing the use of finer gauge wire and longer wire runs.

Generally speaking, pursuant to various embodiments, systems, apparatuses and methods are provided herein for use in an irrigation system. In one form, the irrigation system includes: a valve configured to open to enable irrigation and to close to stop irrigation; a solenoid coupled to the valve, the solenoid configured for activation to open the valve; a controller coupled to the solenoid, the controller configured to generate an activation signal to activate the solenoid; and a hybrid circuit configured to generate a DC signal for a predetermined time interval at initiation of the activation signal and then an AC signal after the predetermined time interval for the activation signal.

In some implementations, in the system, the solenoid includes a plunger, wherein when the solenoid is activated, the plunger moves to open the valve. In some implementations, when the solenoid is activated, the plunger moves to open or close a pilot valve, which controls opening of the valve. In some implementations, the hybrid circuit includes a full wave bridge rectification circuit to supply the DC signal. In some implementations, the predetermined time interval for providing the DC signal is at least ten milliseconds. In some implementations, the hybrid circuit is integrated into the controller. In some implementations, the controller includes a timer configured to measure the predetermined time interval for the DC signal. In some implementations, the hybrid circuit is integrated into the solenoid. In some implementations, the solenoid includes a timer processor configured to measure the predetermined time interval for the DC signal. In some implementations, the controller is coupled to the solenoid by wire, the hybrid circuit being disposed along the wire intermediate the controller and the solenoid.

In another form, there is provided a controller for an irrigation system including: a user interface configured to allow a user to input an irrigation schedule for the irrigation system, the irrigation system including a valve and a solenoid, the solenoid being coupled to the valve; and a hybrid circuit integrated into the controller, the controller being coupled to the solenoid and configured to generate an AC activation signal to activate the solenoid, the hybrid circuit being configured to convert the AC activation signal to a DC signal for a predetermined time interval at initiation of the AC activation signal and then to convert back to an AC signal after the predetermined time interval. The controller may also utilize any of the various implementations addressed in the preceding paragraphs.

In another form, there is provided a method of irrigation including: by a controller coupled to a solenoid of an irrigation system, generating an AC activation signal to activate the solenoid; by a hybrid circuit, converting the AC activation signal to a DC signal for a predetermined time interval at initiation of the AC activation signal; by the hybrid circuit, converting the DC signal back to an AC signal after the predetermined time interval; by the solenoid, activating to open a valve; and by the valve, opening to start irrigation and closing to stop irrigation. The method may also implement any of the implementations addressed in the preceding paragraphs.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the technological contribution. The actual scope of the protection sought is intended to be defined in the following claims.

What is claimed is:

1. A controller for an irrigation system comprising:
    a user interface configured to allow a user to input an irrigation schedule for the irrigation system; and
    a circuit in communication with the user interface, the circuit activating a solenoid in accordance with the irrigation schedule;
    wherein the circuit receives an AC source signal from an electrical source and converts it to a DC activation signal for a predetermined time interval for transmission to the solenoid to initially move a plunger of the solenoid at activation of the solenoid;
    wherein the circuit stops converting the AC source signal to a DC activation signal after the predetermined time interval and transmits an AC activation signal to the solenoid to maintain solenoid activation.

2. The controller of claim 1, wherein the controller is configured to generate the DC activation signal and the AC activation signal to activate the solenoid in accordance with the irrigation schedule.

3. The controller of claim 1, wherein the circuit comprises a full wave bridge rectification circuit to switch between the AC source signal and the DC activation signal.

4. The controller of claim 1, wherein the predetermined time interval for conversion of the AC source signal to the DC activation signal is at least ten milliseconds.

5. The controller of claim 1, further comprising a timer configured to measure the predetermined time interval where the AC source signal is converted to the DC activation signal.

6. The controller of claim 1, wherein the irrigation system comprises the solenoid and a valve, the solenoid being coupled to the valve.

7. The controller of claim 1, wherein the circuit includes a bridge rectifier to convert the AC source signal to the DC activation signal.

8. The controller of claim 7, wherein the circuit includes a plurality of switches to control sending the AC source signal to the bridge rectifier.

9. The controller of claim 8, wherein the plurality of switches control bypassing the bridge rectifier.

10. The controller of claim 1 wherein the DC activation signal is supplied for no longer than one second.

* * * * *